UNITED STATES PATENT OFFICE.

DAVID C. SIMPSON, OF EDINBURGH, SCOTLAND, ASSIGNOR TO THE SIMPSON LABEL COMPANY, LIMITED, OF SAME PLACE.

COMPOSITION FOR FIXING INK-IMPRESSIONS.

SPECIFICATION forming part of Letters Patent No. 442,463, dated December 9, 1890.

Application filed May 13, 1890. Serial No. 351,677. (No specimens.) Patented in England October 17, 1889, No. 16,342.

*To all whom it may concern:*

Be it known that I, DAVID CUMMING SIMPSON, engraver and printer, of 8 Saint James Place, in the city of Edinburgh, Scotland, have invented a certain new or Improved Composition for Fixing Ink-Impressions, (for which I have obtained Letters Patent in the United Kingdom of Great Britain and Ireland, No. 16,342, dated October 17, 1889, and in no other country,) which invention is fully set forth in the specification thereof accompanying this application.

My invention consists of a new or improved composition or solution of chemical preparations of lead, potassium, and copper, being the acetate of lead, the chlorate of potassium, and the acetate of copper, soluble in water, for the treatment of paper and the like, to render writings or markings indelible thereon. I use these materials in or about the following proportions, viz: one pound acetate of lead, one-fourth pound chlorate of potassium, and one ounce acetate of copper, soluble in water, to one gallon of water, (preferably distilled river or rain water;) but these proportions may be varied according to the nature of the substances to which the solution is to be applied.

The solution is applied by immersion or by coating with a brush or sponge, or it may be incorporated in the pulp in the manufacture of paper, card-board, or manila, the effect in any case being that the ink or other writing, printing, or marking material subsequently used becomes indelible in water, thereby enabling the said material to be exposed to wet or damp without being materially affected thereby.

The purpose of the invention is to furnish a composition which will act as a mordant and have the effect of rendering ordinary writing-inks, in the preparation of which inks gall is employed, quickly insoluble in water, and thus fixing the impression to the paper or other material to which it is applied. This the composition does in substantially the same way that a mordant binds a dye to cloth, linen, or cottons.

Having thus described my said invention and shown how the same may be carried into practice, I claim—

The new or improved composition of soluble acetate of lead, chlorate of potassium, and acetate of copper for the treatment of paper and the like to render writings or markings indelible thereon, substantially as set forth.

In testimony whereof I have hereunto set my hand in the presence of two subscribing witnesses.

D. C. SIMPSON.

Witnesses:
 JOHN WALKER,
 WM. ADAM WHITE,
*Chartered Accountants, 30 St. Andrew Square, Edinburgh.*